(12) United States Patent
Ripken et al.

(10) Patent No.: US 12,515,175 B2
(45) Date of Patent: Jan. 6, 2026

(54) COMPOSITE MEMBRANE

(71) Applicants: Fujifilm Manufacturing Europe B.V., Tilburg (NL); Fujifilm Corporation, Tokyo (JP)

(72) Inventors: Renée Maria Ripken, Tilburg (NL); Elisa Huerta Martinez, Tilburg (NL); Takeshi Narita, Tilburg (NL); Maarten Constant Gerlach Marie Meijlink, Tilburg (NL); Jacko Hessing, Tilburg (NL)

(73) Assignees: Fujifilm Manufacturing Europe B.V., Tilburg (NL); Fujifilm Corporation, Tokyo (JP)

( * ) Notice: Subject to any disclaimer, the term of this patent is extended or adjusted under 35 U.S.C. 154(b) by 508 days.

(21) Appl. No.: 18/041,835

(22) PCT Filed: Sep. 2, 2021

(86) PCT No.: PCT/EP2021/074267
§ 371 (c)(1),
(2) Date: Feb. 16, 2023

(87) PCT Pub. No.: WO2022/049193
PCT Pub. Date: Mar. 10, 2022

(65) Prior Publication Data
US 2023/0311071 A1  Oct. 5, 2023

(30) Foreign Application Priority Data

Sep. 3, 2020  (GB) ...................................... 2013838

(51) Int. Cl.
*B01D 69/12* (2006.01)
*B01D 61/44* (2006.01)
(Continued)

(52) U.S. Cl.
CPC ....... *B01D 69/1216* (2022.08); *B01D 61/445* (2013.01); *B01D 67/0006* (2013.01);
(Continued)

(58) Field of Classification Search
CPC ..... B01D 61/455; B01D 69/1216; B01J 43/00
See application file for complete search history.

(56) References Cited

U.S. PATENT DOCUMENTS

| 2014/0378561 | A1 | 12/2014 | Van Berchum et al. |
| 2018/0043345 | A1 | 2/2018 | Barber et al. |
| 2019/0134570 | A1* | 5/2019 | Pintauro ................ B01D 71/82 |

FOREIGN PATENT DOCUMENTS

| JP | 4774520 B2 | 9/2011 |
| WO | 2016/113518 A1 | 7/2016 |
| WO | 2017/205458 A1 | 11/2017 |

* cited by examiner

*Primary Examiner* — Alexander W Keeling
(74) *Attorney, Agent, or Firm* — Banner & Witcoff, Ltd.

(57) ABSTRACT

A composite membrane comprising: a) a first layer comprising a first porous support and a first ionic polymer present in the pores of the first porous support; b) a second layer comprising a second porous support and a second ionic polymer present in the pores of the second porous support; c) a third layer comprising a third porous support, a third ionic polymer and a fourth ionic polymer, wherein the third ionic polymer is present in the pores of the third porous support; wherein: (i) one of the first ionic polymer and the second ionic polymer is a cationic polymer and the other is an anionic polymer; (ii) the third layer c) is interposed between the first layer a) and the second layer b); (iii) the third ionic polymer comprises a network of pores and the fourth ionic polymer is present within the pores of the third ionic polymer; and (iv) one of the third ionic polymer and the fourth ionic polymer is a cationic polymer and the other is an anionic polymer.

23 Claims, 1 Drawing Sheet

(51) Int. Cl.
*B01D 67/00* (2006.01)
*B01D 69/02* (2006.01)
*B01D 69/10* (2006.01)
*B01J 43/00* (2006.01)
*B01J 47/12* (2017.01)
*B32B 5/26* (2006.01)
*B32B 27/08* (2006.01)
*B32B 27/12* (2006.01)
*C08J 5/22* (2006.01)
*B32B 5/02* (2006.01)

(52) U.S. Cl.
CPC ......... *B01D 69/02* (2013.01); *B01D 69/1071* (2022.08); *B01D 69/1213* (2022.08); *B01D 69/125* (2013.01); *B01J 43/00* (2013.01); *B01J 47/12* (2013.01); *B32B 5/26* (2013.01); *B32B 27/08* (2013.01); *B32B 27/12* (2013.01); *C08J 5/2275* (2013.01); *B01D 2323/46* (2013.01); *B01D 2325/42* (2013.01); *B32B 5/022* (2013.01); *B32B 5/024* (2013.01); *B32B 2260/021* (2013.01); *B32B 2260/046* (2013.01); *C08J 2325/18* (2013.01)

COMPOSITE MEMBRANE

RELATED APPLICATIONS

This application is a National Stage Application under 35 U.S.C. 371 of PCT application PCT/EP2021/074267 designating the United States and filed Sep. 2, 2021; which claims the benefit of GB application number 2013838.4 and filed Sep. 3, 2020; each of which are hereby incorporated by reference in their entireties.

This invention relates to composite membranes and to processes for their preparation and use. Ion exchange membranes are used in electrodialysis, reverse electrodialysis, electrolysis, diffusion dialysis and a number of other processes. Typically the transport of ions through the membranes occurs under the influence of a driving force such as an ion concentration gradient or, alternatively, an electrical potential gradient.

Ion exchange membranes are generally categorized as cation exchange membranes or anion exchange membranes, depending on their predominant charge. Cation exchange membranes comprise negatively charged groups that allow the passage of cations but reject anions, while anion exchange membranes comprise positively charged groups that allow the passage of anions but reject cations. A bipolar ion exchange membrane has both a cationic layer and an anionic layer.

Some ion exchange membranes comprise a porous support which provides mechanical strength. Such membranes are often called "composite membranes" due to the presence of both an ionically charged polymer which discriminates between oppositely charged ions and the porous support which provides mechanical strength.

Composite membranes are known from, for example, U.S. Pat. No. 4,253,900, which describes a bipolar membrane containing a monobead layer of ion exchange resin. WO2017/205458 and the article by McClure in ECS Transactions, 2015 69 (18) pages 35-44 describe a bipolar membrane containing a junction layer of interpenetrating polymer nanofibers or microfibers of anion exchange polymers and cation exchange polymers. Other examples of composite membranes are described in e.g. EP3604404, wherein one of the layers comprise an ion exchange resin powder, and U.S. Pat. No. 4,673,454 disclosing the use of an ion exchange resin in an interfacial layer. There is a desire to provide composite membranes having improved properties, e.g. high permselectivity, low electrical resistance, good mechanical strength, low swelling under aqueous conditions, stability at extremes of pH. Ideally such membranes may be produced quickly, efficiently and cheaply.

According to a first aspect of the present invention there is provided a composite membrane comprising:
 a) a first layer comprising a first porous support and a first ionic polymer present in the pores of the first porous support;
 b) a second layer comprising a second porous support and a second ionic polymer present in the pores of the second porous support;
 c) a third layer comprising a third porous support, a third ionic polymer and a fourth ionic polymer, wherein the third ionic polymer is present in the pores of the third porous support;
 wherein:
  (i) one of the first ionic polymer and the second ionic polymer is a cationic polymer and the other is an anionic polymer;
  (ii) the third layer c) is interposed between the first layer a) and the second layer b);
  (iii) the third ionic polymer comprising a network of pores and the fourth ionic polymer is present within the pores of the third ionic polymer; and
  (iv) one of the third ionic polymer and the fourth ionic polymer is a cationic polymer and the other is an anionic polymer.

In this specification (including its claims), the verb "comprise" and its conjugations is used in its non-limiting sense to mean that items following the word are included, but items not specifically mentioned are not excluded. In addition, reference to an element by the indefinite article "a" or "an" does not exclude the possibility that more than one of the elements is present, unless the context clearly requires that there be one and only one of the elements. The indefinite article "a" or "an" thus usually means "at least one". Also in this specification the third ionic polymer comprising a network of pores is often abbreviated to "the third ionic polymer".

Preferably the porous supports are non-ionic.

In a preferred embodiment the third ionic polymer is obtainable by phase-separation of the third ionic polymer from a composition used to prepare the third ionic polymer. In this way one may obtain the third ionic polymer comprising a network of pores and the pores may be used to receive the fourth ionic polymer (or a curable composition used to prepare the fourth ionic polymer) in order to make the third layer c). In one embodiment the curable composition used to prepare the fourth ionic polymer is identical to the curable composition used to prepare the first ionic polymer. In this way one may obtain a composite membrane in which the first ionic polymer is identical to the fourth ionic polymer.

Preferably the third ionic polymer comprises a porous first polymeric domain comprising ionic groups and a network of pores. Preferably the fourth ionic polymer comprises a second polymeric domain comprising ionic groups having a charge opposite to the charge of the ionic groups of the first polymeric domain. In this embodiment the second polymeric domain is located in the pores of the first polymeric domain (i.e. in the pores of the third ionic polymer).

In an especially preferred embodiment, in the third layer c) the third and fourth ionic polymers are present as a co-continuous network comprising the third and fourth ionic polymers. The third and fourth ionic polymers preferably provide two individual continuous, intermingled, non-mixed, non-encapsulated and non-fibrillar polymeric domains, one bearing anionic charges and the other bearing cationic charges. Optionally the third layer c) contains one or more further polymeric domains, each of which bears an anionic charge or a cationic charge.

In a preferred embodiment the fourth ionic polymer is chemically identical to the first ionic polymer in the first layer a). In another preferred embodiment, the third ionic polymer has the same charge as and/or is chemically identical to the second ionic polymer in the second layer b).

In another preferred embodiment, the fourth ionic polymer is chemically identical to the first ionic polymer in the first layer a), and the third ionic polymer is chemically identical to the second ionic polymer in the second layer b).

The third layer c) preferably comprises at least two continuous intermingled polymeric domains (one domain derived from the third ionic polymer and the other domain derived from the fourth ionic polymer) having a large contact area with each other. This may be achieved by the third ionic polymer comprising a network of pores and the fourth ionic polymer being different to the third ionic polymer (e.g. one is cationic and the other is anionic) and being present within the pores of the third ionic polymer. As a result of this large contact area between the two (or more) ionic polymers present in the third layer, when the composite membrane is used as a bipolar membrane, the amount of water molecules that is dissociated into H+ and OH— per time unit is increased and thereby the productivity of the composite bipolar membrane is also increased.

The large contact area between the third and fourth ionic polymers present in the third layer is preferably provided by a co-continuous network wherein the two (or more) polymeric domains derived from the third and fourth ionic polymers bear opposite charges (i.e. one domain has anionic charges and the other has cationic charges). An advantage of the co-continuous network is that newly produced anions (e.g. $OH^-$) and cations (e.g. $H^+$) created at the interface between the third and fourth ionic polymers (i.e. the interface of the two polymeric domains) are separated into the individual polymeric domains immediately after their formation, preventing ion recombination. In addition, the adhesion between the third and fourth ionic polymers (i.e. adhesion between the first and second polymeric domains) in the third layer is extremely strong as a result of the entanglement, and the large contact area between the third and fourth ionic polymers in the third layer c). The strong adhesion between the third and fourth ionic polymers prevents/reduces the so-called ballooning effect in which large water-filled blisters are formed at the interface between the positively and the negatively charged polymers of a bipolar membrane, where $OH^-$ and $H^+$ might recombine to form water.

The composite membrane of the present invention preferably comprises an interface between the first layer a) and the third layer c) (a first interface) and an interface between the third layer c) and the second layer b) (a second interface) and preferably both the first interface and the second interface are uninterrupted, without any gaps and/or spaces between the first layer a) and the third layer c) and without any gaps and/or spaces between the third layer c) and the second layer b).

In one embodiment the third layer c) comprises a blend morphology of two continuous polymeric domains derived from the third and fourth ionic polymers respectively, of which one domain (derived from the fourth ionic polymer) is located within the other domain (derived from the third ionic polymer), forming a co-continuous network (of the fourth ionic polymer within the third ionic polymer).

Preferably each of the first and second polymeric domains is continuous, and substantially comprises a single covalently linked carbon backbone such that it is interconnected to itself.

Preferably the polymeric domains are not encapsulated, not isolated, not discontinued and are non-fibrillar (e.g. not made by electrospinning).

The co-continuous network preferably comprises two (or more) continuous polymeric domains within the same volume. In other words, two (or more) continuous polymeric domains are co-habiting the same volume in close proximity and are not homogeneously mixed such that each phase can be independently distinguished. Thus third and fourth ionic polymers are discrete and not homogeneously mixed with each other and can be independently distinguished from the other, e.g. by cutting through the third layer c) and examining a cross-section of the third layer c) using a scanning electron microscope. Thus the third layer c) is very different from a layer formed simply by intermixing two oppositely charged polymers or from mixing two different curable compositions and then curing the mixture.

In the present invention the third layer c) comprises a porous support and within the porous structure of this support the third ionic polymer comprising a network of pores and the fourth ionic polymer present within those pores preferably provide (a co-continuous network of) two polymeric domains of which one bears anionic charges and the other cationic charges. The two (or more) polymeric domains (one from the third ionic polymer and another from the fourth ionic polymer present within the network of pores of the third ionic polymer) occupy the pores of the porous support and preferably comprise a seamless (third) interface (the first and second interfaces being between the third layer c) and the first and second layers a) and b) respectively). Thus the composite membrane preferably comprises an interface between the third layer c) and the first layer a), an interface between the third layer c) and the second layer b), and a third interface within the third layer c) between the third ionic polymer and the fourth ionic polymer. Preferably this third interface is uninterrupted, without any gaps and/or spaces between the third ionic polymer and the fourth ionic polymer. Preferably this third interface is not an interface between an ionic polymer and fused/compressed fibers, beads, or particles.

Preferably the volume ratio of the third ionic polymer to the fourth ionic polymer in the third layer c) is such that the volume ratio of anionic polymer to cationic polymer in the third layer c) is from 0.1 to 0.9, more preferably from 0.2 to 0.8, especially 0.3 to 0.7, e.g. about 0.4, about 0.5 or about 0.6.

In one embodiment the third ionic polymer is obtained by a process comprising polymerisation-induced phase separation, more preferably photo-polymerization induced phase separation, e.g. of the third ionic polymer from a composition used to prepare that polymer. This preference arises because such a process is particularly good at providing a third ionic polymer capable of receiving the fourth (oppositely charged) ionic polymer. In this process, preferably the third ionic polymer is formed by a photo-polymerization reaction.

Preferably, the third ionic polymer comprises a network of pores which has an average pore diameter of less than 5 µm, more preferably less than 2 µm, especially less than 1.2 µm. The pores between the third ionic polymer may then be filled with a curable composition and that curable composition may then be cured in order to provide the fourth ionic polymer within the third ionic polymer's network of pores. In a preferred embodiment the third ionic polymer's network of pores is substantially or completely filled with the fourth ionic polymer. As a consequence, the third layer results in which the third porous support is filled with the third ionic polymer and the network of pores of the third ionic polymer is filled with the (oppositely charged) fourth ionic polymer. The third and fourth ionic polymers may therefore provide a continuous network comprising two polymeric domains: one from the third ionic polymer and another from the fourth ionic polymer. In a preferred embodiment this continuous network is free from other polymers (except for any polymer present in the porous support). In one embodiment there are covalent bonds connecting the third and fourth ionic polymers together. In fact the network of pores in the porous third ionic polymer may comprise more than one ionic polymer, e.g. the network of pores in the third ionic polymer may comprise the first ionic polymer (derived from a first curable composition) and optionally a second ionic polymer (derived from a second curable composition) such that the first polymer is acting as fourth ionic polymer to partly fill the pores of the third ionic polymer and the second ionic polymer is filling the remaining pores. Additionally the network of pores in the porous third ionic polymer may comprise one or more further polymers if desired.

According to a second aspect of the present invention there is provided a process for preparing the composite membrane according to the first aspect of the present invention comprising the following steps:

I. providing a first porous support, a second porous support and a third porous support;
II. providing a first curable composition comprising a curable ionic compound, a second curable composition comprising a curable ionic compound of charge opposite to the curable compound present in the first curable composition, a third curable composition comprising a curable ionic compound and a fourth curable composition comprising a curable ionic compound of charge opposite to the curable compound present in the third curable composition;
III. impregnating the third porous support with the third curable composition;
IV. curing the third curable composition present in the third porous support to form a layer comprising the third porous support and the third, ionic polymer comprising a network of pores (hereinafter abbreviated to "the base layer" for brevity);
V. impregnating the network of pores of the third ionic polymer with the fourth curable composition;
VI. contacting the first curable composition with a first side of the base layer;
VII. contacting the second curable composition with a second side of the base layer; and
VIII. curing the first curable composition, the second curable composition and the fourth curable composition in any order or simultaneously thereby forming the first ionic polymer, the second ionic polymer and the fourth ionic polymer respectively;
wherein:
(a) when curing the first curable composition the first curable composition comprises the first porous support; and
(b) when curing the second curable composition the second curable composition comprises the second porous support.

The process of the second aspect of the present invention may be performed in a number of different ways but is not limited to those described below in more detail.

In one embodiment of the process, the first curable composition comprises the first porous support when it is applied to the first side of the base layer. For example the first porous support may be impregnated with the first curable composition and the impregnated support so prepared may then be contacted with the base layer. In one embodiment at least some of the first curable composition in excess of the composition present in the first porous support enters the network of pores in the base layer. Then, when the first composition is cured to form the first ionic polymer, the first porous support adheres strongly to the base layer be means of the first ionic polymer. Furthermore, curing of the first curable composition within the network of pores in the base layer also forms the fourth polymer and thereby forms third layer c) partially or wholly. In this embodiment the first polymer present in the pores of the base layer and the first polymer forming the first layer a) are covalently bound and thereby form a very strong connection between the first layer a) and the third layer c).

In an alternative embodiment, the first porous support is applied to the first curable composition after the first curable composition has been applied to the first side of the base layer. For example, the base layer is coated with the first curable composition (whereby the pores of the base layer are at least partly impregnated by the first curable composition) and then the first porous support is contacted with the first curable composition which is present on the base layer.

As in the previous embodiment, when the first composition is cured to form the first ionic polymer, the first porous support adheres strongly to the base layer be means of a multitude of covalent bonds within the first ionic polymer.

In a similar manner, in one embodiment the second curable composition comprises the second porous support when it is applied to the second side of base layer. For example the second porous support may be impregnated with the second curable composition and the impregnated support so prepared may then be contacted with the base layer. In one embodiment at least some of the second curable composition in excess of the composition present in the second porous support enters the remaining pores in the base layer. Preferably after contacting the second curable composition with the base layer no air remains at the interface between the base layer and the second curable composition. Then, when the second composition is cured to form the second ionic polymer, the second porous support adheres strongly to the base layer be means of the second ionic polymer.

In an alternative embodiment, the second porous support is applied to the second curable composition after the second curable composition has been applied to the second side of the base layer. For example, the base layer is coated with the second curable composition and then the second porous support is contacted with the second curable composition which is present on the base layer. As in the previous embodiment, when the second composition is cured to form the second ionic polymer, the second porous support adheres strongly to the base layer be means of the second ionic polymer.

In one embodiment the first curable composition comprising the first porous support is cured before second composition comprising the second porous support is cured. Alternatively the first curable composition comprising the first porous support and the second composition comprising the second porous support may be cured simultaneously.

In one embodiment the first curable composition comprising the first porous support and the second curable composition comprising the second porous support are applied to the first side of base layer and to the second side of the base layer respectively simultaneously or in either order. Preferably the first curable composition comprising the first porous support is applied to the first side of base layer before the second curable composition comprising the second porous support is applied to the second side of the base layer, or the first curable composition comprising the first porous support and the second curable composition comprising the second porous support are applied simultaneously to the first side of base layer and to the second side of the base layer respectively.

In another embodiment the first side of the base layer carries a coating of the first curable composition, the second side of the base layer carries a coating of the second curable composition and the first porous support and the second porous support are applied simultaneously or in either order to the first side of base layer coated with the first curable composition and to the second side of base layer coated with the second curable composition respectively.

In yet another embodiment the fourth curable composition is not identical to the first curable composition and is applied to the first side of base layer and cured before the first curable composition is applied (either already comprising the first porous support or not) to the first side of base layer.

As a result, the composite membrane is formed comprising a third ionic polymer and a fourth ionic polymer in the third layer, a first ionic polymer in the first layer and a second ionic polymer in the second layer.

In the present invention, the third ionic polymer is preferably free from thread-like structures (such as fibres) other than the porous support. Furthermore, preferably the third ionic polymer is free from (fused) beads and encapsulated structures.

As described above, one may obtain the third layer c) by a process comprising formation of the third ionic polymer comprising a network of pores from a third curable composition by polymerisation-induced phase separation and then impregnating the network of pores with a fourth curable composition suitable for forming the fourth polymer and curing the fourth curable composition within the network of pores of the third ionic polymer and optionally on the surface of the third ionic polymer in order to simultaneously make one of the other layers (i.e. layer a)) at the same time as making third layer c).

BRIEF DESCRIPTION OF THE DRAWINGS

In FIG. 1A, Layer 1 is a polymer layer, Layer 3 is a centre layer comprising fibrous elements and Layer 2 is another polymer layer.

In FIG. 1B, Layer 1 is first layer a) comprising a first ionic polymer and a porous support (not shown). Layer 3 is third layer c) comprising the third and fourth ionic polymers in black and white respectively. The third ionic polymer (black) is located within the pores of the third porous support (not shown) and the fourth ionic polymer (white) is within the pores of the third ionic polymer (black). Layer 2 is the second layer b) comprising the second porous support (not shown).

In FIG. 2 the manufacturing unit comprises unwinding station (1), curable composition application station (2), metering station (3), curing station (4), drying station (5), curable composition application station (6), unwinding stations (7), laminating station (8), curing station (9) and membrane collecting station (10).

Figure 1A:
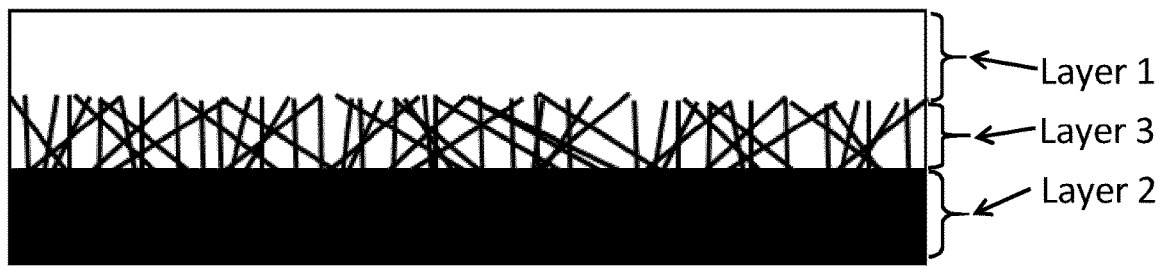
FIG. 1A illustrates a cross-section through a typical composite membrane described in the prior art.
Figure 1B:
FIG. 1B illustrates a cross-section through composite membrane according to the present invention.

In one embodiment the porous supports present in the first layer a), the second layer b) and the third layer c) are chemically and physically identical.

In another embodiment the porous supports present in two of the layers a), b) and c) are chemically and physically identical to each other and the porous support present in the remaining layer of the layers a), b) and c) is chemically and/or physically different to the porous supports present in the other two layers.

In a further embodiment the porous support present in each of the layers a), b) and c) is chemically and/or physically different to the porous supports present in the other two of the layers a), b) and c). The preference depends on the intended use of the composite membrane.

As examples of porous supports which may be included in the layers a), b) and/or c) there may be mentioned woven and non-woven synthetic fabrics and extruded films. Examples include wetlaid and drylaid non-woven material, spunbond and meltblown fabrics and nanofiber webs made from, e.g. polyethylene, polypropylene, polyacrylonitrile, polyvinyl chloride, polyphenylenesulfide, polyester, polyamide, polyaryletherketones such as polyether ether ketone and copolymers thereof. Porous supports may also be porous membranes, e.g. polysulfone, polyethersulfone, polyphenylenesulfone, polyphenylenesulfide, polyimide, polyethermide, polyamide, polyamideimide, polyacrylonitrile, polycarbonate, polyacrylate, cellulose acetate, polypropylene, poly(4-methyl 1-pentene), polyinylidene fluoride, polytetrafluoroethylene, polyhexafluoropropylene and polychlorotrifluoroethylene membranes and derivatives thereof.

Preferably the porous supports present in the first layer a), the second layer b) and the third layer c) each independently have an average thickness of between 10 and 200 µm, more preferably between 20 and 150 µm and especially 50 to 100 µm.

Preferably the porous supports have a porosity of between 30 and 95%. The porosity of a support may be determined by a porometer, e.g. a Porolux™ 1000 from IB-FT GmbH, Germany.

One or more of the porous supports may be treated to modify its surface energy, e.g. to values above 45 mN/m, preferably above 55 mN/m. Suitable treatments include corona discharge treatment, plasma glow discharge treatment, flame treatment, ultraviolet light irradiation treatment, chemical treatment or the like, e.g. for the purpose of improving the wettability of and the adhesiveness to the porous support.

Commercially available porous supports are available from a number of sources, e.g. from Freudenberg Filtration Technologies (Novatexx materials), Lydall Performance Materials, Celgard LLC, APorous Inc., SWM (Conwed Plastics, DelStar Technologies), Teijin, Hirose, Mitsubishi Paper Mills Ltd and Sefar AG.

Preferably each support independently is a polymeric support. Preferred supports comprise a woven or non-woven synthetic fabric or an extruded film without covalently bound ionic groups.

Preferably the first layer a), the second layer b) and the third layer c) of the composite membrane each independently has an average thickness of between 10 µm and 200 µm, more preferably 20 to 150 µm and especially 50 to 100 µm.

Preferably the composite membrane has an average thickness of between 30 µm and 600 µm, more preferably 60 to 450 µm and especially 150 to 300 µm.

Preferably the composite membrane of the present invention is a composite bipolar membrane.

Preferably the first ionic polymer is obtainable by a process comprising curing a first curable composition comprising:
  (a1) 0 to 60 wt % of a curable compound having one ethylenically unsaturated group and an ionic group;
  (b1) 1 to 88 wt % of a curable compound comprising at least two ethylenically unsaturated groups and optionally an ionic group;
  (c1) 0 to 10 wt % of radical initiator; and
  (d1) 0 to 55 wt % of solvent.

Preferably the second ionic polymer is obtainable by a process comprising curing a second curable composition comprising:

(a2) 0 to 60 wt % of a curable compound having one ethylenically unsaturated group and an ionic group of charge opposite to the curable compound present in the first curable composition;

(b2) 1 to 88 wt % of a curable compound comprising at least two ethylenically unsaturated groups and optionally an ionic group (of charge opposite to the curable compound present in the first curable composition);

(c2) 0 to 10 wt % of radical initiator; and (d2) 0 to 55 wt % of solvent.

As mentioned above, the third ionic polymer is preferably obtained from a process comprising polymerisation-induced phase separation of the third ionic polymer from a third curable composition used to prepare the third ionic polymer. This process is particularly useful for providing the third ionic polymer in a form which comprises a network of pores capable of receiving a fourth curable composition (which may be identical to the first curable composition or different to the first curable composition) for preparation of the fourth ionic polymer within the network of pores (and optionally on the surface of the third ionic polymer too, if desired, in order to provide the first layer a) in a very efficient manner).

In this way one may prepare and then impregnate the network of pores present in the third ionic polymer with a fourth curable composition suitable for forming the fourth polymer and cure the fourth curable composition within the pores of the third ionic polymer and optionally on the surface of the third ionic polymer in order to simultaneously make layer a) at the same time as making third layer c).

Preferably the third ionic polymer comprising the network of pores is obtainable by a process comprising curing a third curable composition comprising:

(a3) 0 to 60 wt % of a curable compound having one ethylenically unsaturated group and an ionic group;

(b3) 1 to 70 wt % of a curable compound comprising at least two ethylenically unsaturated groups and optionally an ionic group;

(c3) 0 to 10 wt % of radical initiator; and (d3) 20 to 98 wt % of solvent.

Preferably component (a3) in the third curable composition has an ionic group of charge opposite to the curable compound present in the first curable composition.

Preferably the fourth ionic polymer is obtainable by a process comprising curing a fourth curable composition which falls within the definition provided above for the first curable composition. The fourth curable composition may be the same as or different to the first curable composition. Preferably the fourth curable composition comprises a curable compound having one ethylenically unsaturated group and an ionic group of charge opposite to the curable compound present in the third curable composition. Thus, the fourth ionic polymer is obtainable by a process comprising curing a fourth curable composition comprising:

(a4) 0 to 60 wt % of a curable compound having one ethylenically unsaturated group and an ionic group of charge opposite to the curable compound present in the third curable composition;

(b4) 1 to 88 wt % of a curable compound comprising at least two ethylenically unsaturated groups and optionally an ionic group (of charge opposite to the curable compound present in the third curable composition);

(c4) 0 to 10 wt % of radical initiator; and (d4) 0 to 55 wt % of solvent.

Each component present in the curable compositions may be a mixture of several compounds falling within the respective definition. The amount of each of component (a1), (a2) and (a4) independently is preferably 0 to 40 wt %.

The amount of component (a3) is preferably 0 to 30 wt %, especially 0 to 20 wt %.

The amount of each of components (b1), (b2) and (b4) independently is preferably 5 to 80 wt %, especially 10 to 70 wt %.

The amount of component (b3) is preferably 9 to 65 wt %, especially 14 to 59 wt %, more especially 19 to 49 wt %.

The curable compositions preferably comprise a radical initiator (component (c1), (c2), (c3)) and (c4) when it is intended to cure the composition by UV, visible light or thermally. Alternative methods for curing include electron beam and gamma irradiation. Those methods do not require a radical initiator. Thus the amount of component (c1), (c2), (c3) and (c4) present in the relevant compositions is preferably 0 to 2 wt %, more preferably—for curing by UV, visible light or thermally—0.001 to 2 wt %, especially 0.005 to 0.9 wt %.

The amount of component (d1), (d2) and (d4) present in the relevant compositions is preferably 20 to 45 wt %.

Preferably the solvent(s) used as component (d1), (d2) and (d3) are inert, i.e. they do not react with any of the other components of the curable composition.

The amount of component (d3) is preferably 30 to 90 wt %, especially 40 to 85 wt %, more especially 49 to 78 wt %.

Component (d3) is preferably a single solvent.

Component (d3) optionally comprises two or more inert solvents, at least one of which is a solvent for the other components of the curable composition and at least one of which is a non-solvent for the third ionic polymer formed from curing the composition, e.g. by phase separation, thereby forming the third ionic polymer comprising a network of pores capable of receiving the fourth curable composition.

Examples of inert solvents include water, alcohol-based solvents, ether-based solvents, amide-based solvents, ketone-based solvents, sulfoxide-based solvents, sulfone-based solvents, nitrile-based solvents and organic phosphorus-based solvents. Examples of alcohol-based solvents which may be used as or in component (d3) (especially in combination with water) include methanol, ethanol, isopropanol, n-butanol, ethylene glycol, propylene glycol, diethylene glycol, dipropylene glycol and mixtures comprising two or more thereof. Water is particularly preferred.

In addition, preferred inert, organic solvents which may be used in component (d3) include dimethyl sulfoxide, dimethyl imidazolidinone, sulfolane, N-methyl pyrrolidone, dimethyl formamide, acetonitrile, acetone, 1,4-dioxane, 1,3-dioxolane, tetramethyl urea, hexamethyl phosphoramide, hexamethyl phosphorotriamide, pyridine, propionitrile, butanone, cyclohexanone, tetrahydrofuran, tetrahydropyran, 2-methyltetrahydrofuran, ethylene glycol diacetate, cyclopentylmethylether, methylethylketone, ethyl acetate, y-butyrolactone and mixtures comprising two or more thereof. Dimethyl sulfoxide, N-methyl pyrrolidone, dimethyl formamide, dimethyl imidazolidinone, sulfolane, acetone, cyclopentylmethylether, methylethylketone, acetonitrile, tetrahydrofuran, 2-methyltetrahydrofuran and mixtures comprising two or more thereof are preferable.

In one embodiment component (d3) comprises at least one of the solvents from list (i) below and at least one of the solvents from list (ii) below:

list (i): iso-propanol, methanol, ethanol, acetone, tetramethyl urea, hexamethyl phosphoramide, hexamethyl phosphorotriamide, butanone, cyclohexanone, methylethylketone, tetrahydrofuran, tetrahydropyran, 2-methyltetrahydrofuran, cyclopentylmethylether, propionitrile, acetonitrile, 1,4-dioxane, 1,3-dioxolane, ethyl acetate, γ-butyrolactone; and list (ii): water, glycerol, ethylene glycol, dimethyl sulfoxide, sulpholane, dimethyl imidazolidinone, sulfolane, N-methyl pyrrolidone, N,N-dimethyl formamide, N-methyl morpholine, acetonitrile, acetone, 1,4-dioxane, 1,3-dioxolane, tetramethyl urea, hexamethyl phosphoramide, hexamethyl phosphorotriamide, pyridine, propionitrile, butanone, cyclohexanone, tetrahydrofuran, tetrahydropyran, 2-methyltetrahydrofuran, ethylene glycol diacetate, cyclopentylmethylether, methylethylketone, ethyl acetate and γ-butyrolactone.

In one embodiment component (d3) comprises water and one or other more solvents from list (i).

Preferably one of the first curable composition and the second curable composition comprises a curable compound having an ethylenically unsaturated group and an anionic group and the other comprises a curable compound having an ethylenically unsaturated group and a cationic group. Furthermore, preferably one of the third curable composition and the fourth curable composition comprises a curable compound having an ethylenically unsaturated group and an anionic group and the other comprises a curable compound having an ethylenically unsaturated group and a cationic group.

Examples of a curable compounds having an ethylenically unsaturated group and an anionic group or cationic group include the following compounds of Formula (A), (B), (CL), (SM), (MA), (MB-α), (C), (ACL-A), (ACL-B), (ACL-C), and/or (AM-B):

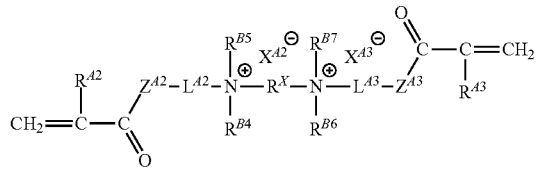
Formula (A)

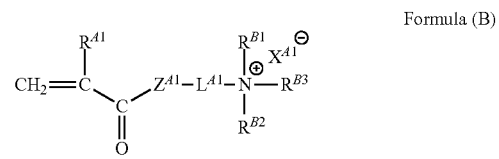
Formula (B)

wherein in Formulae (A) and (B):
$R^{A1}$ to $R^{A3}$ each independently represent a hydrogen atom or an alkyl group; $R^{B1}$ to $R^{B7}$ each independently represent an alkyl group or an aryl group;
$Z^{A1}$ to $Z^{A3}$ each independently represent —O— or —NRa—, wherein Ra represents a hydrogen atom or an alkyl group;
$L^{A1}$ to $L^{A3}$ each independently represent an alkylene group, an arylene group or a divalent linking group of a combination thereof;
$R^{X}$ represents an alkylene group, an alkenylene group, an alkynylene group, an arylene group, or a divalent linking group of a combination thereof; and
$X^{A1}$ to $X^{A3}$ each independently represent an organic or inorganic anion, preferably a halogen ion or an aliphatic or aromatic carboxylic acid ion.

Examples of compounds of Formula (A) or (B) include:

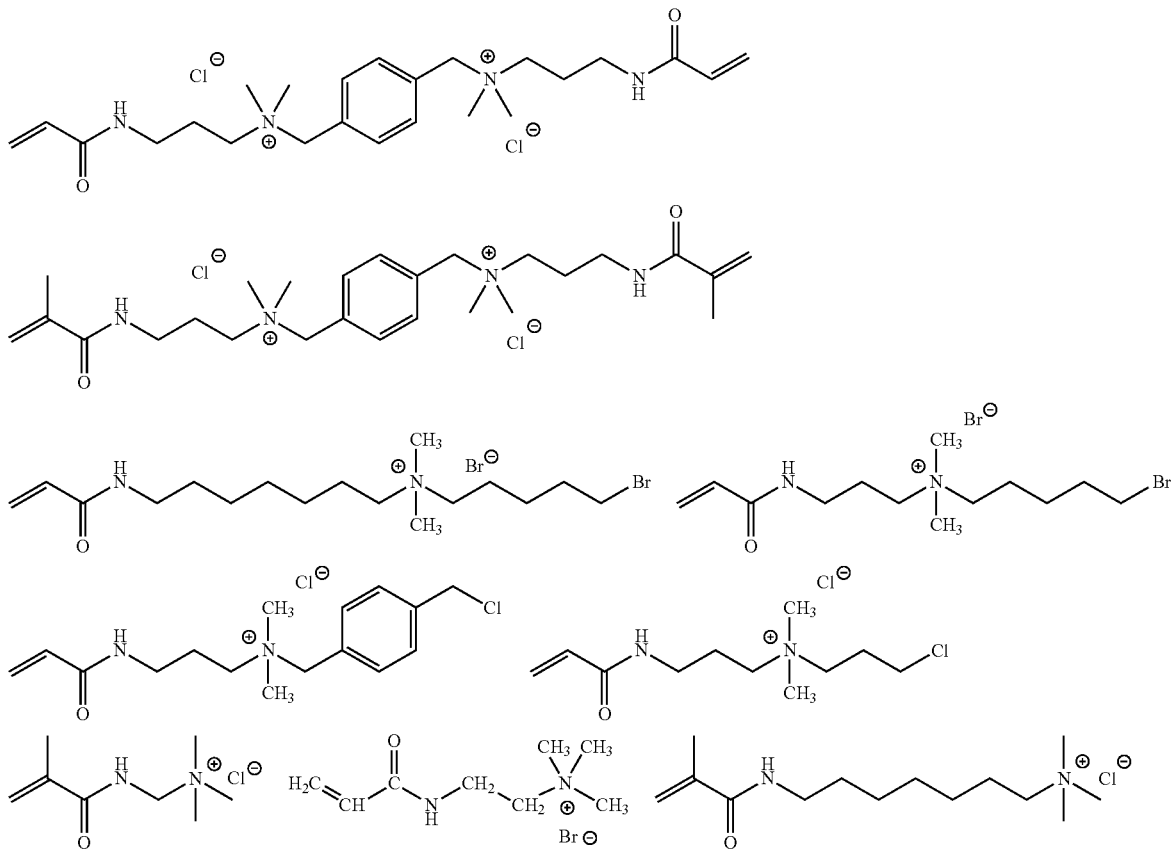

-continued
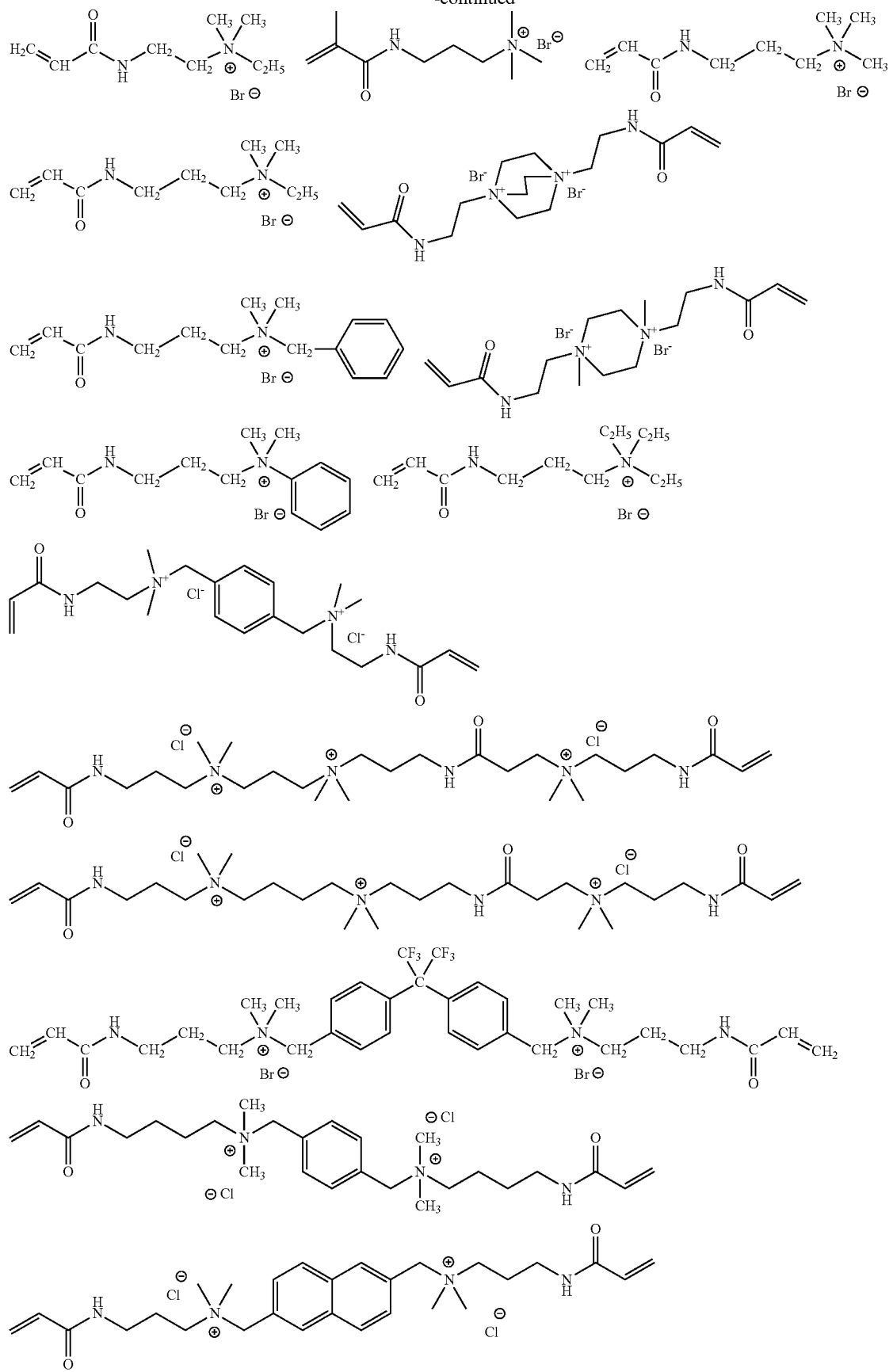

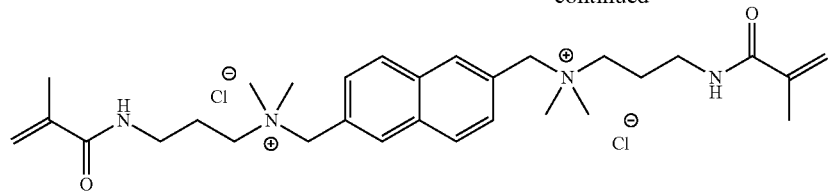

Synthesis methods can be found in e.g. US2015/0353721, US2016/0367980 and US2014/0378561.

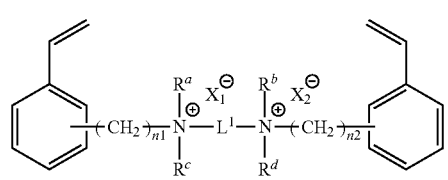
(CL)

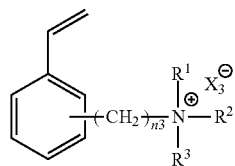
(SM)

wherein in Formulae (CL) and (SM):

$L^1$ represents an alkylene group or an alkenylene group;

$R^a$, $R^b$, $R^c$, and $R^d$ each independently represent a linear or branched alkyl group or an aryl group, $R^a$ and $R^b$, and/or $R^c$ and $R^d$ may form a ring by being bonded to each other;

$R^1$, $R^2$, and $R^3$ each independently represent a linear or branched alkyl group or an aryl group, $R^1$ and $R^2$, or $R^1$, $R^2$ and $R^3$ may form an aliphatic heterocycle by being bonded to each other;

$n^1$, $n^2$ and $n^3$ each independently represent an integer of 1 to 10; and $X_1^-$, $X_2^-$ and $X_3^-$ each independently represent an organic or inorganic anion.

Examples of formula (CL) and (SM) include:

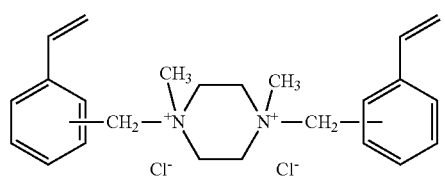

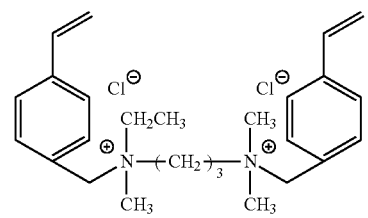

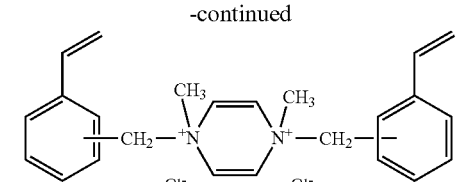

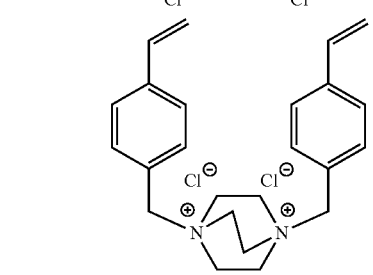

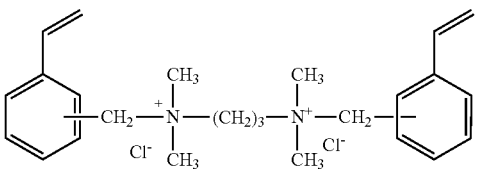

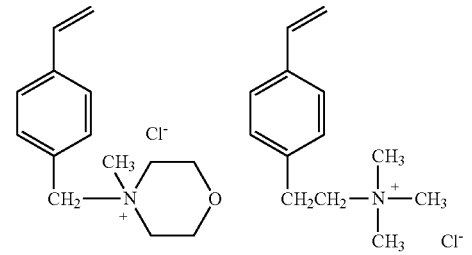

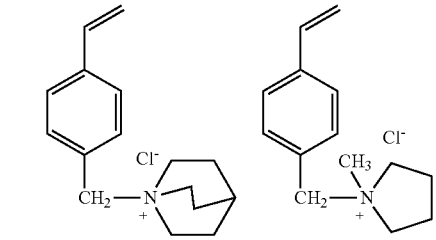

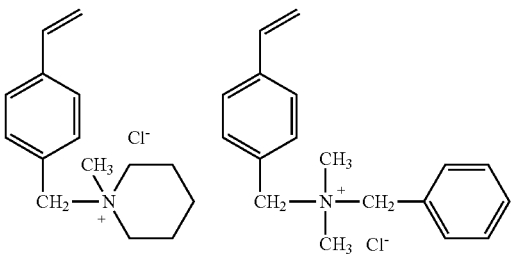

Synthesis methods can be found in EP3184558 and US2016/0001238.

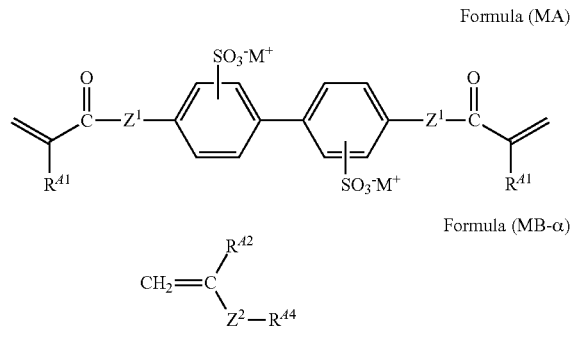

Formula (MA)

Formula (MB-α)

wherein in formula (MA) and (MB-α), $R^{41}$ represents a hydrogen atom or an alkyl group;

$Z^1$ represents —O— or —NRa—, wherein Ra represents a hydrogen atom or an alkyl group;

$M^+$ represents an organic or inorganic cation, preferably a hydrogen ion or an alkali metal ion;

$R^{42}$ represents a hydrogen atom or an alkyl group, $R^{44}$ represents an organic group comprising a sulphonic acid group and having no ethylenically unsaturated group; and $Z^2$ represents —NRa—, wherein Ra represents a hydrogen atom or an alkyl group preferably a hydrogen atom.

Examples of formula (MA) and (MB-α) include:

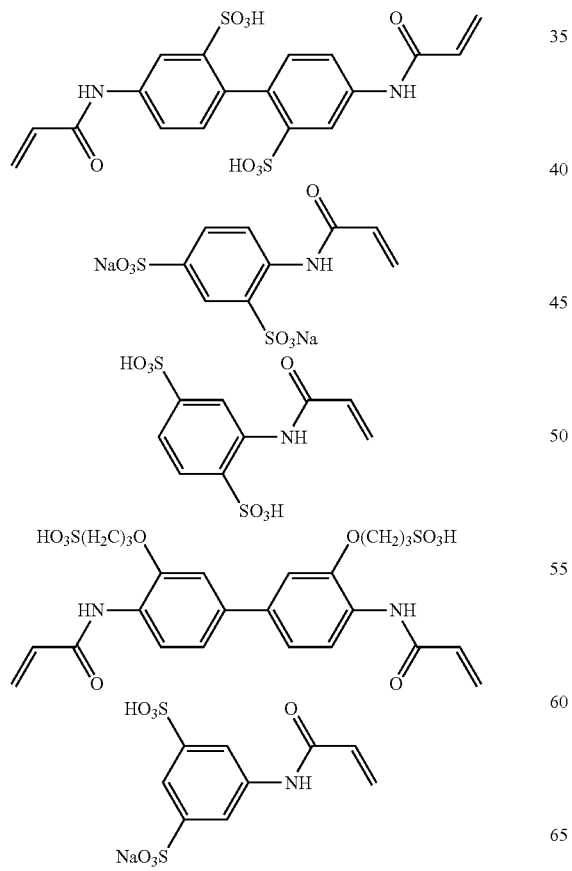

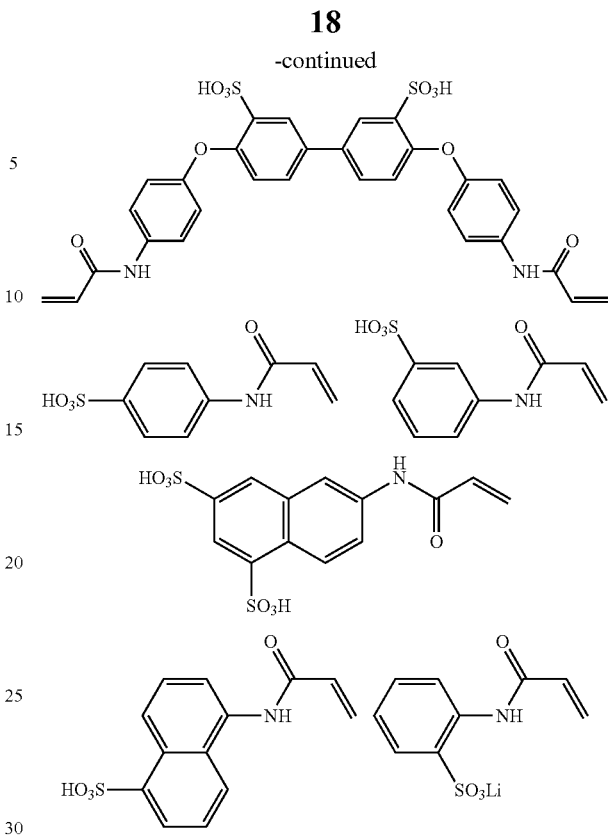

Synthesis methods can be found in e.g. US2015/0353696.

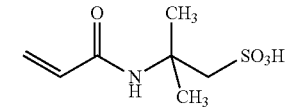

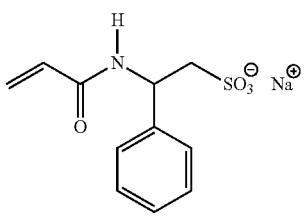

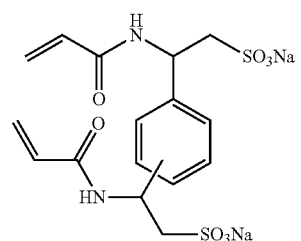

Synthesis methods can be found in e.g. US2016/0369017.

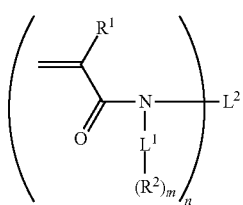

Formula (C)

wherein in Formula (C),
$L^1$ represents an alkylene group;
n represents an integer of 1 to 3, preferably 1 or 2;
m represents an integer of 1 or 2;
$L^2$ represents an n-valent linking group;
$R^1$ represents a hydrogen atom or an alkyl group;
$R^2$ represents $-SO_3^-M^+$ or $-SO_3R^3$; in case of plural $R^2$s, each $R^2$ independently
represents $-SO_3M^+$ or $-SO_3R^3$;
$M^+$ represents a hydrogen ion, an inorganic ion, or an organic ion; and
$R^3$ represents an alkyl group or an aryl group.
Examples of formula (C) include:

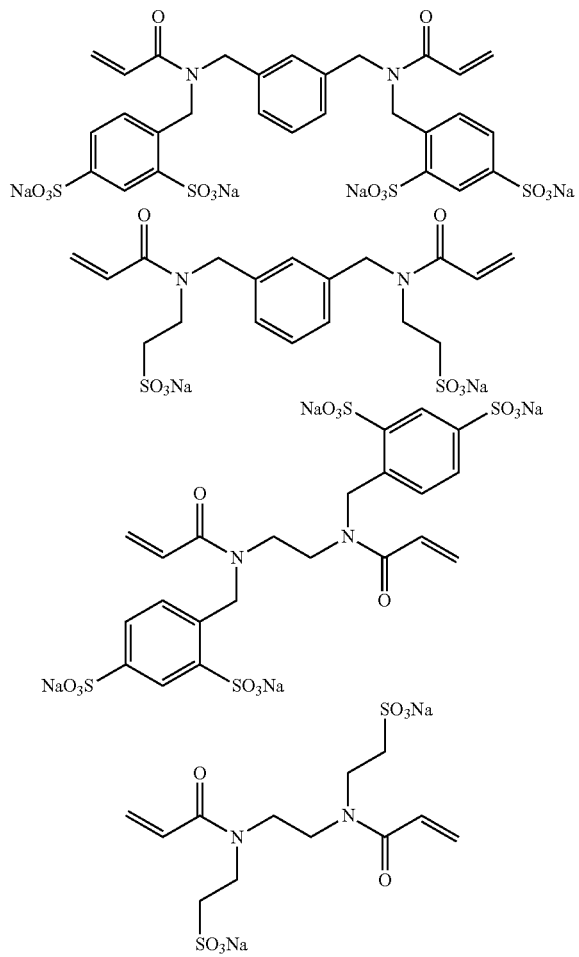

Synthesis methods can be found in EP3187516.

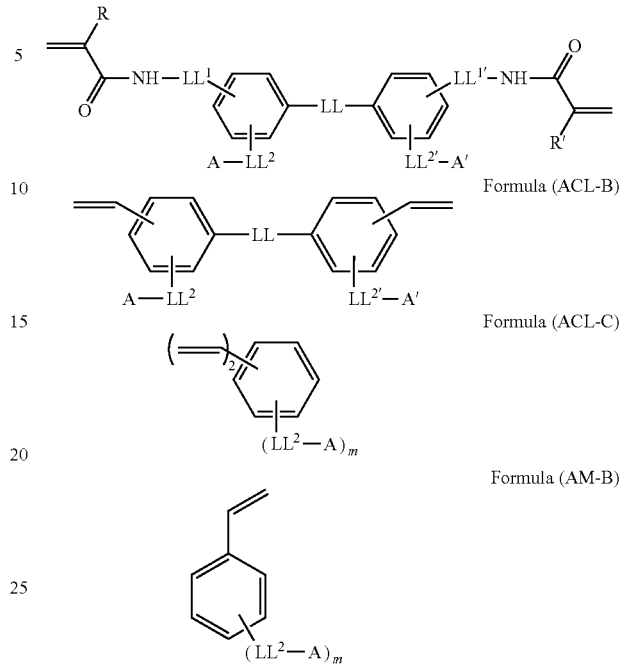

wherein in Formulas (ACL-A), (ACL-B), (ACL-C) and (AM-B),
each of R and R' independently represents a hydrogen atom or an alkyl group;
LL represents a single bond or a bivalent linking group;
each of $LL^1$, $LL^{1'}$, $LL^2$, and $LL^{2'}$ independently represents a single bond or a bivalent linking group; and each of A and A' independently represents a sulfo group in free acid or salt form and
m represents 1 or 2.
Examples of formula (ACL-A), (ACL-B), (ACL-C) and (AM-B) include:

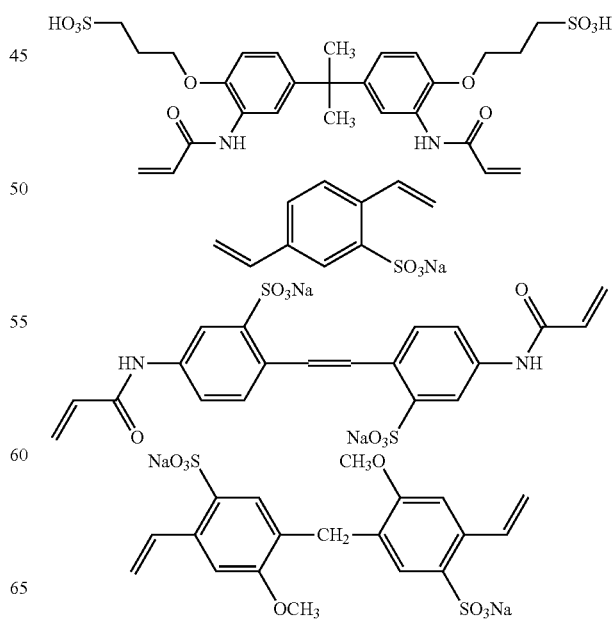

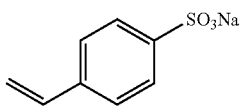

Synthesis methods can be found in US2016/0362526.
Other suitable monomers include:

M-23
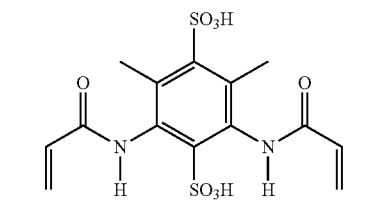

M-24
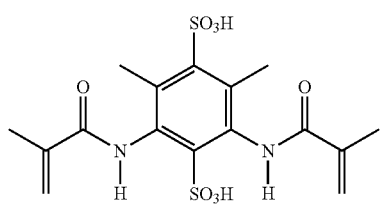

M-25
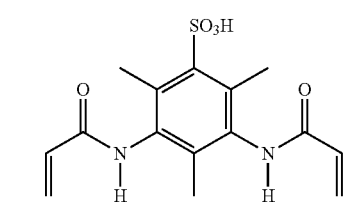

M-26
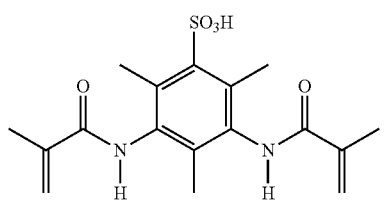

M-27
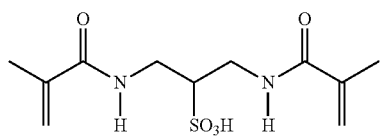

M-28
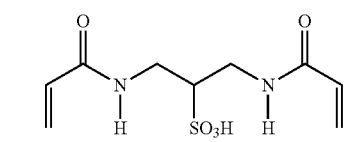

M-29
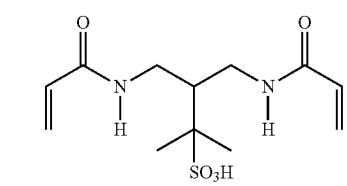

M-30
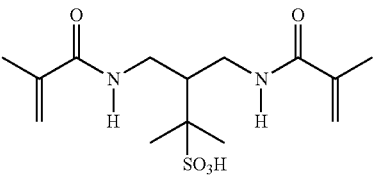

M-31
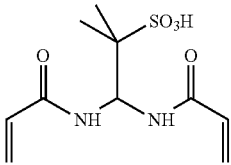

M-32
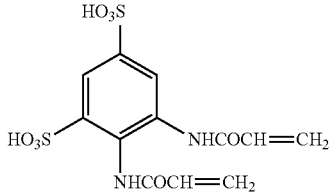

M-33
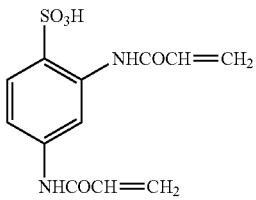

M-34
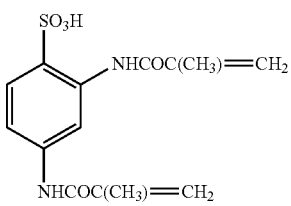

The curable compositions may be cured by any suitable process, including thermal curing, photocuring, electron beam (EB) radiation, gamma radiation, and combinations of the foregoing. However the curable compositions are preferably cured by photocuring, e.g. by irradiating the curable compositions by ultraviolet of visible light and thereby causing the curable components present in the compositions to polymerise.

Examples of suitable thermal initiators which may be included in the curable compositions include 2,2'-azobis(2-methylpropionitrile) (AIBN), 4,4'-azobis(4-cyanovaleric acid), 2,2'-azobis(2,4-dimethyl valeronitrile), 2,2'-azobis(2-methylbutyronitrile), 1,1'-azobis(cyclohexane-1-carbonitrile), 2,2'-azobis(4-methoxy-2,4-dimethyl valeronitrile), dimethyl 2,2'-azobis(2-methylpropionate), 2,2'-azobis[N-(2-propenyl)-2-methylpropionamide, 1-[(1-cyano-1-methylethyl)azo]formamide, 2,2'-Azobis(N-butyl-2-methylpropionamide), 2,2'-Azobis(N-cyclohexyl-2-methylpropionamide), 2,2'-Azobis(2-methylpropionamidine) dihydrochloride, 2,2'-Azobis[2-(2-imidazolin-2-yl)propane]dihydrochloride, 2,2'-Azobis[2-(2-imidazolin-2-yl)propane]disulfate dihydrate, 2,2'-Azobis[N-(2-carboxyethyl)-2-methylpropionamidine]hydrate, 2,2'-Azobis{2-[1-(2-hydroxyethyl)-2-imidazolin-2-yl]propane}dihydrochloride, 2,2'-Azobis[2-(2-imidazolin-2- yl)propane], 2,2'-Azobis(1-imino-1-pyrrolidino-2-ethylpropane) dihydrochloride, 2,2'-Azobis{2-methyl-N-[1,1-bis(hydroxymethyl)-2-hydroxyethl]propionamide} and 2,2'-Azobis[2-methyl-N-(2-hydroxyethyl)propionamide].

Examples of suitable photoinitiators which may be included in the curable compositions include aromatic ketones, acylphosphine compounds, aromatic onium salt compounds, organic peroxides, thio compounds, hexaarylbiimidazole compounds, ketoxime ester compounds, borate compounds, azinium compounds, metallocene compounds, active ester compounds, compounds having a carbon halogen bond, and an alkyl amine compounds. Preferred examples of the aromatic ketones, the acylphosphine oxide compound, and the thio-compound include compounds having a benzophenone skeleton or a thioxanthone skeleton described in "RADIATION CURING IN POLYMER SCIENCE AND TECHNOLOGY", pp. 77-117 (1993). More preferred examples thereof include an alpha-thiobenzophenone compound described in JP1972-6416B (JP-S47-6416B), a benzoin ether compound described in JP1972-3981B (JP-S47-3981B), an alpha-substituted benzoin compound described in JP1972-22326B (JP-S47-22326B), a benzoin derivative described in JP1972-23664B (JP-S47-23664B), an aroylphosphonic acid ester described in JP1982-30704A (JP-S57-30704A), dialkoxybenzophenone described in JP1985-26483B (JP-S60-26483B), benzoin ethers described in JP1985-26403B (JP-S60-26403B) and JP1987-81345A (JPS62-81345A), alpha-amino benzophenones described in JP1989-34242B (JP H01-34242B), U.S. Pat. No. 4,318,791A, and EP0284561A1, p-di(dimethylaminobenzoyl)benzene described in JP1990-211452A (JP-H02-211452A), a thio-substituted aromatic ketone described in JP1986-194062A (JPS61-194062A), an acylphosphine sulfide described in JP1990-9597B (JP-H02-9597B), an acylphosphine described in JP1990-9596B (JP-H02-9596B), thioxanthones described in JP1988-61950B (JP-S63-61950B), and coumarins described in JP1984-42864B (JP-S59-42864B). In addition, the photoinitiators described in JP2008-105379A and JP2009-114290A are also preferable. In addition, photoinitiators described in pp. 65 to 148 of "Ultraviolet Curing System" written by Kato Kiyomi (published by Research Center Co., Ltd., 1989) may be used.

Especially preferred photoinitiators include Norrish Type II photoinitiators having an absorption maximum at a wavelength longer than 380 nm, when measured in one or more of the following solvents at a temperature of 23° C.: water, ethanol and toluene. Examples include a xanthene, flavin, curcumin, porphyrin, anthraquinone, phenoxazine, camphorquinone, phenazine, acridine, phenothiazine, xanthone, thioxanthone, thioxanthene, acridone, flavone, coumarin, fluorenone, quinoline, quinolone, naphtaquinone, quinolinone, arylmethane, azo, benzophenone, carotenoid, cyanine, phtalocyanine, dipyrrin, squarine, stilbene, styryl, triazine or anthocyanin-derived photoinitiator.

The curable compositions may be applied continuously to moving porous supports, preferably by means of a manufacturing unit comprising curable composition application stations, one or more curing stations comprising irradiation source(s) for curing the compositions, a membrane collecting station and a means for moving the porous supports from the curable composition application stations to the curing station(s) and to the membrane collecting station.

The curable composition application stations may be located at an upstream position relative to the curing station(s) and the curing station(s) is/are located at an upstream position relative to the membrane collecting station.

Examples of application techniques include slot die coating, slide coating, air knife coating, roller coating, screen printing, and dipping. Depending on the used technique and the desired end specifications, it might be necessary to remove excess coating from the substrate by, for example, roll-to-roll squeeze, roll-to-blade or blade-to-roll squeeze, blade-to-blade squeeze or removal using coating bars. Curing by ultraviolet of visible light can occur at wavelengths between 100 nm and 800 nm using doses between 40 and 2000 mJ/cm$^2$. Thermal curing preferably takes place in the range between 20° C. and 100° C. for 0 to 20 h.

In some cases additional drying might be needed for which temperatures between 40° C. and 200° C. could be employed.

The composite membrane of the present invention may be manufactured by a number of alternative processes, including the processes described below in more detail.

In the process according to the second aspect of the present invention, step IV. preferably comprises polymerisation-induced phase separation (especially photopolymerisation-induced phase separation) of the third ionic polymer from the third composition.

In one embodiment the composite membrane comprises a catalyst. The catalyst or a precursor thereof may be included in one or more of the first curable composition, the second curable composition, the third curable composition and the fourth curable composition. Also possible is to apply the catalyst or a precursor thereof (e.g. as a post-treatment step) to the third ionic polymer (i.e. after completing step IV and before starting step V.) using for example (but not limited to) dipping, air knife coating, microroller coating, spraying, chemical (vapour) deposition or physical (vapour) deposition.

Examples of suitable catalysts include metal salts, metal oxides, organometallic compounds, monomers, polymers or co-polymers. Examples include, but are not limited to, $FeCl_3$, $FeCl_2$, $AlCl_3$, $MgCl_2$, $RuCl_3$, $CrCl_3$, $Fe(OH)_3$, $Sn(OH)_2$, $Sn(OH)_4$, $SnCl_2$, $SnCl_4$, $SnO$, $SnO_2$, $Al_2O_3$, $NiO$, $Zr(HPO_4)_2$, $MoS_2$, graphene oxide, Fe-polyvinyl alcohol complexes, polyvinyl alcohol (PVA), polyethylene glycol (PEG), polyethyleneimine (PEI), polyacrylic acid (PAA), co-polymer of acrylic acid and maleic anhydride (PAAMA) and hyperbranched aliphatic polyester. Any of these catalysts may be present in a range up to 5 wt %, e.g. 0.001 wt % or 1 wt %, of the weight of the membrane.

The composite membranes of the present invention may be used for various applications, including electrodialysis and acid/base production. The present composite membranes may also be used as bipolar membranes, particularly as they have good durability in acidic and basic media, low swelling, and may be produced cheaply, quickly and efficiently.

Figure 2:
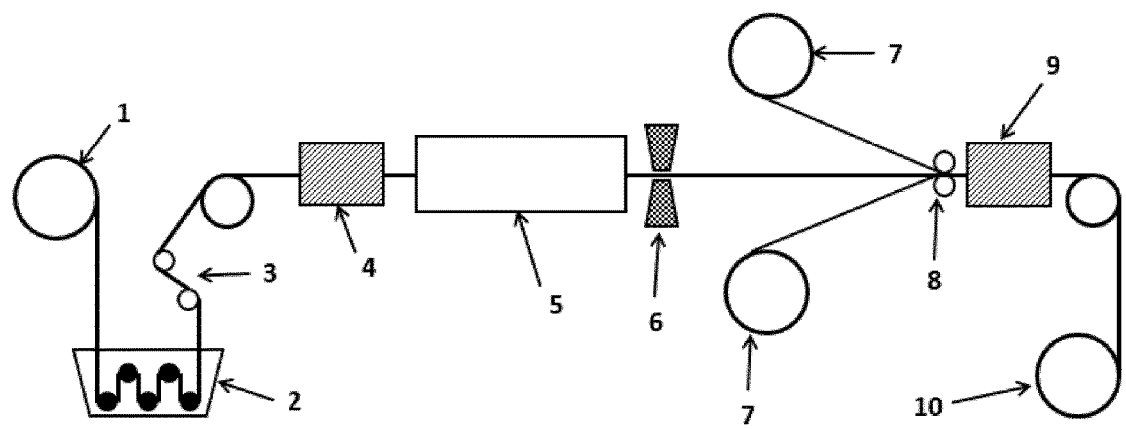
FIG. 2 illustrates an embodiment of a process for preparing the composite membrane according to the present invention.

In an exemplary embodiment of the present invention the composite membrane is prepared by the process schematically depicted in FIG. 2.

A moving third porous support is unwound at unwinder (1), the third porous support is impregnated with a third curable composition at curable composition application station (2), excess third curable composition is removed, e.g. by squeeze bars, at metering station (3) and the impregnated third porous support is cured at curing station (4) thereby forming the third ionic polymer comprising a network of pores within the pores of the third porous support (abbreviated herein as "the base layer"). Optionally solvent is removed at drying station (5). Then at curable composition application station (6) a first curable composition (which also acts as the fourth curable composition) and a second curable composition are simultaneously applied to the first and second side of the base layer, optionally such that either or both of the first and second curable compositions impregnate the network of pores of the third ionic polymer present in the base layer. First and second porous supports are unwound at unwinder station (7) and brought into contact with the first side and the second side of the base layer respectively at lamination station (8) thereby the first and second porous supports becoming impregnated with the first and second curable composition respectively. At curing station (9) the first and second curable compositions are cured thereby forming the first layer a), the second layer b) with the third layer c) being interposed therebetween. Finally, the formed composite membrane comprising third layer c) interposed between the first layer a) and the second layer b) is collected at membrane collecting station (10).

In a preferred embodiment the steps of applying the fourth curable composition to the base layer and the application of the first curable composition are combined by simply applying an excess of the fourth curable composition to the base layer such that the fourth curable composition impregnates the pores on one side of the base layer and forms a curable layer thereon. Then, when the fourth curable composition is cured, the fourth ionic polymer is formed on one side of the base layer and provides the first layer a) (the fourth curable composition thereby acting also as the first curable composition to form the first layer a)).

Optionally the process further comprises the step(s) of pre-treating one or more of the porous supports to enhance their wetting properties. Alternatively one may use commercially available porous supports which have already been treated to enhance their wetting properties.

For the avoidance of doubt, step VIII. can be used to form layer a) on one side of the base layer, layer b) on the other side of the base layer (or on the other side of layer c) when curing the first curable composition forms both layers a) and c)) and optionally also layer c) (when curing of the first composition did not form layer c) already In a preferred embodiment the fourth curable composition is identical to the first curable composition and step VI. is performed prior to step V. and prior to step VI. the first porous support is impregnated with the first curable composition. Prior to step VII. the part of step VIII. wherein the first curable composition is cured, is performed which includes the curing of the first curable composition present in the pores of the base layer (also referred to as fourth curable composition), thereby forming layer a) and partly or fully forming layer c). Subsequently the second porous support is impregnated with the second curable composition and step VII. is performed. Any remaining pores in the base layer are filled with the second curable composition. Finally the part of step VIII. wherein the second curable composition is cured, is performed, thereby forming layer b) on the side of layer c) opposite to layer a).

In another preferred embodiment the fourth curable composition is identical to the first curable composition and step VI. is performed prior to step V. whereby not only the pores of the base layer are impregnated but also a layer of the first curable composition is formed on the base layer. This is followed by the step of applying the first porous support to the first curable composition whereby the first porous support becomes impregnated with the first curable composition. Subsequently the part of step VIII. wherein the first curable composition is cured, is performed which includes the curing of the first curable composition present in the pores of the base layer (also referred to as fourth curable composition), thereby forming layer a) and partly or fully forming layer c). This is followed by step VII. whereby any remaining pores in the base layer are filled with the second curable composition, after which the second porous support is applied to the second curable composition whereby the second porous support becomes impregnated with the second curable composition. Finally the part of step VIII. wherein the second curable composition is cured, is performed, thereby forming layer b) on the side of layer c) opposite to layer a).

In yet another preferred embodiment after step III, the third porous support impregnated with the third curable composition is placed between transparent foils and subsequently squeezed, e.g. between rollers or blades, to remove any excess of third curable composition. After step IV. the transparent foils are removed. The further steps are preferably as described above in relation to the preferred embodiments.

In a further preferred embodiment step IV. is performed under an inert atmosphere, e.g. under nitrogen, carbon dioxide or argon gas. The other steps are as described above in relation to the preferred embodiments.

The invention will now be illustrated by the following, non-limiting examples in which all parts and percentages are by weight unless specified otherwise.

EXAMPLES

TABLE 1

| Ingredients | | |
|---|---|---|
| Abbreviation | Component Type | Description |
| XL-2 | b1 | 1,3-[N-(ethenylphenylsulphonyl)benzene sulphonamide], dilithium salt |
| XL-D | b1 | Benzenesulphonamide, 2,4-diethenyl-N-(methylsulphonyl)-, lithium salt |
| 4OH-TEMPO | inhibitor | 4-hydroxy-2,2,6,6-tetramethylpiperidin-1-oxyl, a polymerization inhibitor from Sigma-Aldrich |
| MM-M | a1 | Benzenesulphonamide, 4-ethenyl-N-(methylsulphonyl)-, lithium salt |
| water | d1/d2/d3 | Purified water |
| MeOH | d1 | Methanol from Sigma-Aldrich |
| 1MP | d1 | 1-methyl pyrrole from Sigma-Aldrich |
| VBTMAC | a2 | 4-Vinylbenzyl trimethylammonium chloride from Sigma-Aldrich |
| XL-A | b2/b3 | N,N,N',N'-tetramethyldiaminopropane, 1,4-bis[(4-ethenylphenyl)methyl]-, chloride |

TABLE 1-continued

| Abbreviation | Component Type | Description |
|---|---|---|
| LAP | c1/c3 | Phenyl-2,4,6-trimethylbenzoylphosphinate, lithium salt from Sigma-Aldrich |
| Omnirad ™ TPO-L | c1 | 2,4,6-Trimethylbenzoyldi-Phenylphosphinate from IGM Resins |
| Irgacure ® 1173 | c2 | 2-Hydroxy-2-methyl propiophenone from BASF |
| FO-2223-10C | | PP/PE porous support of thickness 100 µm obtained from Freudenberg Filtration Technologies |
| Solupor ™ 10PO5A | | Ultra high molecular weight PE porous support of thickness 50 µm obtained from Lydall performance materials |

Synthesis of XL-A is described in EP29797448 as Synthesis Example 2 on page 21. XL-2, XL-D and MM-M may be synthesized as described below.

PP means polypropylene and PE means polyethylene.

TABLE 2

The First, Second and Third Curable Compositions

| Component | CC1-1 (wt %) | CC1-2 (wt %) | CC2 (wt %) | CC3 (wt %) |
|---|---|---|---|---|
| MM-M | 25 | | | |
| VTBMAC | | | 23 | |
| XL-2 | 35 | | | |
| XI-D | | 66 | | |
| XL-A | | | 46.1 | 36.4 |
| 4OH-TEMPO | 1 | 1 | 2 | 1 |
| LAP | 0.5 | 0.5 | | 0.6 |
| Omnirad ™ TPO-L | 0.5 | 0.5 | | |
| Irgacure ® 1173 | | | 0.9 | |
| water | 28 | | 28 | 62 |
| MeOH | | 32 | | |
| 1MP | | 10 | | |

TABLE 3

Examples

| Supports and compositions | Ex.1 | Ex.2 |
|---|---|---|
| First porous support | FO2223-10C | Solupor ™ 10PO5A |
| Second porous support | FO2223-10C | Solupor ™ 10PO5A |
| Third porous support | FO2223-10C | Solupor ™ 10PO5A |
| First curable composition | CC1-1 | CC1-2 |
| Second curable composition | CC2 | CC2 |
| Third curable composition | CC3 | CC3 |

Preparation Method 1

Step I.

The first, second and third porous supports were as described in Table 3 shown above.

Step II.

First and second curable compositions were prepared by mixing the components indicated in Table 2 shown above. The first curable compositions were also used as fourth curable composition. The third curable composition was prepared by mixing the components indicated in Table 2 above.

Step III.

A 100 µm thick layer of the third curable composition was applied to a PET foil sheet using a Meyer bar. The third porous support (FO2223-10C) was applied to the layer of the third curable composition, thereby becoming impregnated with the third curable composition, A second PET foil sheet was applied to the impregnated third porous support to provide a sandwich of the impregnated third porous support between the two foils. Gently all air was squeezed out of the porous support using a roller.

Step IV.

The sandwich of the impregnated third porous support between the two foils was irradiated using a Light Hammer LH10 from Fusion UV Systems fitted with a D-bulb working at 60% intensity at a speed of 5 m/min in order to cure the third curable composition present in the third porous support. After curing, the PET foils were removed and the cured product was allowed to dry in the air at room temperature to give a base layer (i.e. a third porous support comprising a third ionic polymer comprising a network of pores).

The base layer was dipped in a catalyst solution comprising 1.35 wt % of tin(II)chloride in a slightly acidic aqueous solution, and allowed to dry at room temperature. Subsequently the base layer was dipped in a 0.12N NaOH solution to precipitate the catalyst and was allowed to dry at room temperature.

Step V. and VI.

The first curable composition was applied to a PET foil using a 100 µm Meyer bar. Then the first porous support was applied to the layer of first curable composition on the PET, thereby impregnating the first porous support with the first curable composition. After 5 seconds excess first curable composition was removed from the first porous support using a 24 µm Meyer bar to give a layer of approximately 24 µm thick of the first curable composition on the surface of the impregnated first porous support. The base layer prepared in Step IV. above was placed on top of the layer of first curable composition whereupon the base layer became impregnated with the first curable composition to give a base layer-first porous support composite comprising the first curable monomer in both the first porous support and in the pores of the third ionic polymer.

Step VIII (partly)

The base layer-first porous support composite so prepared was irradiated on one side (the side of the base layer carrying the first porous support) using a Light Hammer LH10 from Fusion UV Systems fitted with a D-bulb working at 50% intensity at a speed of 5 m/min. The resulting cured film was a laminate of layer a) and layer c) in which the pores of the third ionic polymer were filled with cured first curable composition.

Step VII.

A 100 µm layer of the second curable composition was applied to the laminate of layer a) and layer c) on the side opposite to layer a) using a Meyer bar and the second porous support was applied to the layer of the second curable composition. After 5 seconds excess second curable composition was removed using a 4 µm Meyer bar.

Step VIII. (partly)

The product of Step VII. was irradiated on both sides using a Light Hammer LH10 from Fusion UV Systems fitted with a D-bulb working at 50% intensity at a speed of 5 m/min in order to cure the second curable composition. Finally the PET foil was removed to give a bipolar, composite membrane according to the first aspect of the present invention comprising first layer a), second layer b) and the third layer c) interposed between the first layer a) and the second layer b).

Preparation Method 2

Steps I. and II. were performed as described above for Method 1.

Step III.

A 60 µm thick layer of the third curable composition was applied onto the third porous support laying on a PET foil sheet using a Meyer bar. The excess coating was removed using a 4 µm Meyer bar thereby ensuring that the third porous support was impregnated with the third curable composition. A second PET foil sheet was applied to the impregnated third porous support to provide a sandwich of the impregnated third porous support between the two foils. Gently all air was squeezed out of the porous support using a roller.

Step IV.

The sandwich of the impregnated third porous support between the two foils was irradiated using a Light Hammer LH10 from Fusion UV Systems fitted with a D-bulb working at 60% intensity at a speed of 5 m/min. After curing, the PET foils were removed and the cured product was allowed to dry in the air at room temperature to give a base layer (i.e. a third porous support comprising a third ionic polymer comprising a network of pores).

The base layer was dipped in a catalyst solution comprising 1.35 wt % of tin(II)chloride in a slightly acidic aqueous solution, and allowed to dry at room temperature. Subsequently the base layer was dipped in a 0.12N NaOH solution to precipitate the catalyst and was allowed to dry at room temperature.

Step V. and VI.

The first curable composition was applied onto the first porous support laying on a PET foil using a 60 µm Meyer bar. Excess first curable composition was removed using a 4 µm bar, thereby fully impregnating the first porous support with the first curable composition. A second layer of the first curable compositions was applied to the impregnated first porous support using a 24 µm Meyer bar, thereby leaving a layer of approximately 24 µm of first curable composition on the surface of the impregnated first porous support. The base layer comprising a catalyst arising from Step IV. above was placed on the layer of first curable composition whereupon the base layer became impregnated with the first curable composition to give a base layer-first porous support composite comprising the first curable monomer in both the first porous support and in the pores of the third ionic polymer.

Step VIII (partly)

The base layer-first porous support composite was irradiated on one side (the side of the base layer carrying the first porous support) using a Light Hammer LH10 from Fusion UV Systems fitted with a D-bulb working at 50% intensity at a speed of 5 m/min. The resulting cured film was a laminate of layer a) and layer c) in which the pores of the third ionic polymer were filled with cured first curable composition.

Step VII

The second curable composition was applied to the second porous support using a 60 µm Meyer bar to give an impregnated second porous support. The impregnated second porous support was then applied to laminate of layer a) and layer c) on the side opposite to layer a). After 5 seconds excess second curable composition was removed using a 4 µm Meyer bar.

Step VIII (Partly)

The product of Step VII. was irradiated on both sides using a Light Hammer LH10 from Fusion UV Systems fitted with a D-bulb working at 50% intensity at a speed of 5 m/min in order to cure the second curable composition. Finally the PET foil was removed to give a bipolar, composite membrane according to the first aspect of the present invention comprising first layer a), second layer b) and the third layer c) interposed between the first layer a) and the second layer b).

The base layer prepared using either Method 1 or Method 2 was analysed to determine the mean flow pore (MFP) size and the results are shown in Table 4 below.

The mean flow pore size of the pores in the third ionic polymer present in the base layer prepared using either Method 1 or Method 2 (a sample of 18.5 mm in diameter) was determined using a Porolux™ porometer. The sample of base layer was pre-wetted with "Porefill™" fluid for around 15 seconds, and placed in the sample holder. During the measurement, the pores were evacuated using increasing $N_2$ pressure, up to 6 bar until all fluid had been displaced.

TABLE 4

| Property | Method 1 | Method 2 |
| --- | --- | --- |
| MFP size (µm) | 0.965 | 1.041 |
| Smallest pore size (µm) | 0.355 | 0.434 |

The differences between both methods is thought to be due to experimental variation.

Example 1 was Prepared Using Method 1 and
Example 2 was Prepared Using Method 2

Characterization of the Composite Membrane

The volume ratio is the ratio in the third layer c) of the volume of the third ionic polymer to the volume of the fourth ionic polymer, the latter being identical to the first ionic polymer in these examples. The volume ratio was determined by embedding a sample of Ex. 1 in a resin and cutting a thin slice using a microtome. This slice was analysed by an atomic force microscope (AFM) equipped with an infrared probe. Line spectra were accorded across 80 µm, recording an IR spectrum every 3 µm, followed by principle component analysis using the IR spectra. The resultant image showed the third ionic polymer and the fourth ionic polymer as discrete polymers, with the third ionic polymer identified in green and the fourth ionic polymer identified in blue. The third and fourth ionic polymers were seen to be a co-continuous network in the third layer c).

The ratio of the two polymers (i.e. the volume ratio of the third ionic polymer to the fourth ionic polymer in third layer c)) was estimated by its colour and the ratio is given in Table 5 below.

The electrochemical properties of the bipolar composite membranes from Ex. 1 and Ex. 2 and their bipolar characteristics were compared to a commercially available bipolar membrane (BPM) by determining their so called I-U curves, from which the voltage at a certain current density was derived. This evaluation revealed that the voltage of the bipolar composite membranes of the present invention were lower than that of the commercially available BPM at a current density of 800 A/cm$^2$. The results are shown in Table 5 below.

TABLE 5

| Sample | Voltage at 800 A/m$^2$ (V) | Volume ratio |
|---|---|---|
| Commercially Available BPM | 0.98 | n.d. |
| Ex. 1 | 0.89 | 0.44/0.56 |
| Ex. 2 | 0.91 | n.d. | n.d. means not determined

Synthesis of Anionic Monomers and Cross-Linkers and Their Precursors

CI-SS

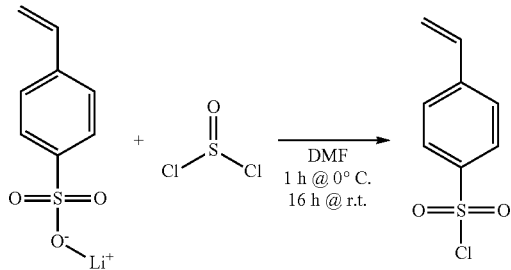

Thionyl chloride (109 mL, 178.46 g, 1.5 mol, 3 moleq) was added dropwise to a solution of 4-vinylbenzenesulfonic acid lithium salt (95.08 g, 0.500 mol, 1 moleq) and 4OH-TEMPO (50 mg, 500 ppm) in DMF (300 mL) in a double-walled reactor that was actively cooled to 5° C. After the addition was completed, the solution was allowed to slowly heat to room temperature and was stirred for another 16 hours. Then the reaction mixture was poured into 1 liter of cold 1M KCl in a separation funnel. The bottom layer was removed and dissolved in 500 mL diethylether. This solution was washed with a 1M KCl-solution (300 mL). The organic layer was dried over sodium sulfate, filtered and concentrated in vacuum to give a yellow oil. The crude product (CL-SS) was used without further purification in the next step. Typical yield is 89.5 g (88%). HPLC-MS purity >98%; $^1$H-NMR: <2 wt % DMF, 0% diethyl ether.

CI-DVBS

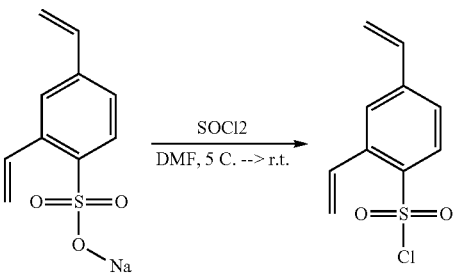

Thionyl chloride (75 mL, 123.1 g, 1.034 mol, 3 moleq) was added dropwise to an solution of divinylbenzene sulfonate sodium salt (80 g, 0.345 mol, 1 moleq) and 4OH-TEMPO (50 mg, 500 ppm) in DMF (300 mL) in a double-walled reactor that was actively cooled to 5° C. After the addition was completed, the solution was allowed to slowly heat to room temperature and was stirred for another 16 hours. Then the reaction mixture was poured into 1 litre of cold 1M KCl in a separation funnel. The bottom layer was removed and dissolved in 500 mL diethylether. This solution was washed with a 1M KCl-solution (300 mL). The organic layer was dried over sodium sulfate, filtered and concentrated in vacuo to give a yellow oil. The crude product (CI-DVBS) was used without further purification in the next step. Typical yield is 62 g (79%). HPLC-MS purity >98%; $^1$H-NMR: <2 wt % DMF, 0% diethyl ether.

NH2-SS

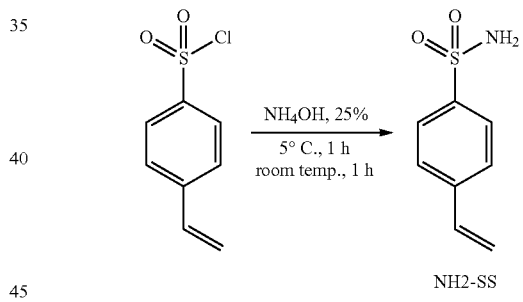

Thionyl chloride (109 mL, 178.46 g, 1.5 mol, 3 moleq) was added dropwise to a solution of 4-vinylbenzene-sulfonic acid lithium salt (95.08 g, 0.500 mol, 1 moleq) and 4OH-TEMPO (50 mg, 500 ppm) in DMF (300 mL) in a double-walled reactor that was actively cooled to 5° C. After the addition was completed, the solution was allowed to slowly heat to room temperature and was stirred for another 16 hours. Then the reaction mixture was poured into 1 liter of cold 1M KCl in a separation funnel. The bottom layer was removed and was added dropwise to a solution of ammonium hydroxide 25% in water (250 mL, 3.67 mol, 15 moleq) and 4OH-TEMPO (50 mg, 500 ppm) in a double-walled reactor that was actively cooled to 5° C. After the addition was completed, the solution was stirred for 1 hour. The solution was then allowed to heat to room temperature and was stirred for one hour. Then the reaction mixture was cooled back to 5° C. and the product was filtered off and washed with 50 mL of cold water. The product (NH2-SS) was dried overnight in vacuum at 30° C. and used without further purification. Typical yield is 66.8 g (73%). HPLC-MS purity >95%.

Synthesis of XL-D

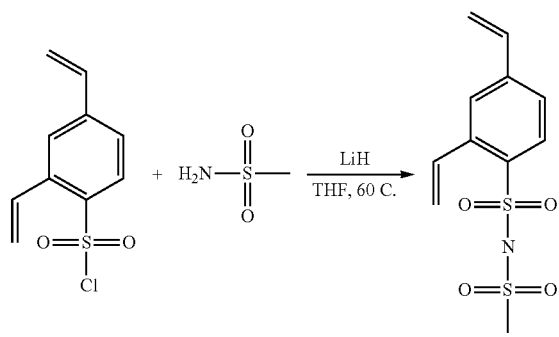

Before the synthesis, methane sulfonamide was dried in a vacuum oven overnight (30° C., vac). To a solution of the dried methane sulfonamide (8.32 g, 0.087 mol, 1 moleq) and 4OH-TEMPO (30 mg, 500 ppm) in THF (100 mL) was added LiH (1.53 g, 0.192 mol, 2.2 moleq) as a solid at once. The reaction mixture was stirred for 30 minutes at room temperature. Then, a solution of Cl-DVBS (20 g, 0.087 mol, 1 moleq) in THF (50 mL) was added to the reaction mixture. After addition, the reaction mixture was heated to 60° C. (water bath temperature). After two days, the reaction mixture was filtrated over celite to remove the excess of LiH. The filtrate was concentrated in vacuo to give a light yellow foam. The resulting foam was dissolved in 500 mL ethyl acetate. Celite was added and the resulting slurry was stirred for 5 minutes. Then, the celite was filtered off and washed with 100 mL ethyl acetate. This Celite procedure was then repeated. The solvent was then evaporated in vacuo and the resulting white foam was washed with 500 mL diethyl ether overnight. The resulting white powder was filtered off and dried in a vacuum oven at 30° C. for 16 h yielding a hygroscopic white solid. Typical achieved yield is 15.5 g (60%). HPLC-MS purity >95%; $^1$H-NMR: <3 wt % residual solvents; 2 wt % divinylbenzene sulfonate; ICP-OES: 24-30 g Li/kg product.

Synthesis of XL-2

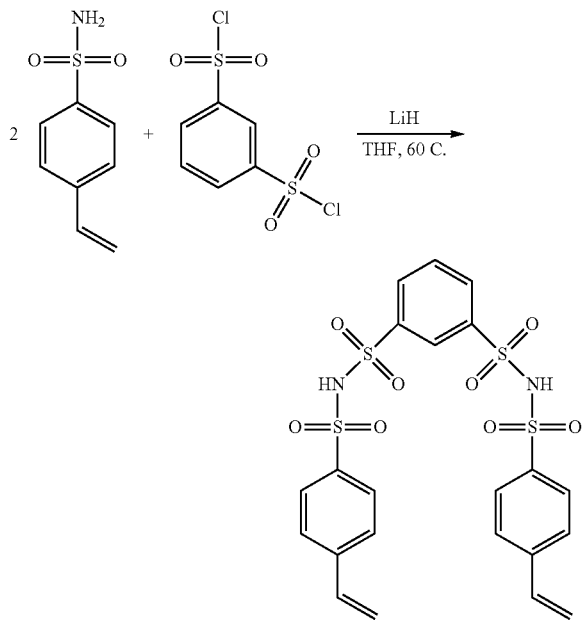

Before the synthesis, styrene sulfonamide (NH2-SS) was dried in a vacuum oven overnight (30° C., vac). To a solution of the dried styrene sulfonamide (16.90 g, 0.092 mol, 2.05 moleq) and 4OH-TEMPO (30 mg, 500 ppm) in THF (100 mL) was added LiH (1.50 g, 0.189 mol, 4.2 moleq) as a solid at once. The reaction mixture was stirred for 30 minutes at room temperature. Then, a solution of 1,3 benzene disulfonyl chloride (12.38 g, 0.045 mol, 1 moleq) in THF (50 mL) was added to the reaction mixture. After addition, the reaction mixture was heated to 60° C. (water bath temperature). After 2 days, the reaction mixture was filtrated over celite to remove the excess of LiH. The filtrate was concentrated in vacuo to give a light yellow foam. The resulting foam was dissolved in 500 mL ethyl acetate. Celite was added and the resulting slurry was stirred for 5 minutes. Then, the celite was filtered off and washed with 100 mL ethyl acetate. This Celite procedure was then repeated. The solvent was then evaporated in vacuo and the resulting white foam was washed with 500 mL diethyl ether overnight. The resulting white powder was filtered off and dried in a vacuum oven at 30° C. for 16 h yielding a hygroscopic white solid. Typical achieved yield is 14.5 g (54%). HPLC-MS purity >96%; $^1$H-NMR: <2 wt % residual solvents; <2 wt % styrene sulfonamide; ICP-OES: 35-40 g Li/kg product.

Synthesis of MM-M

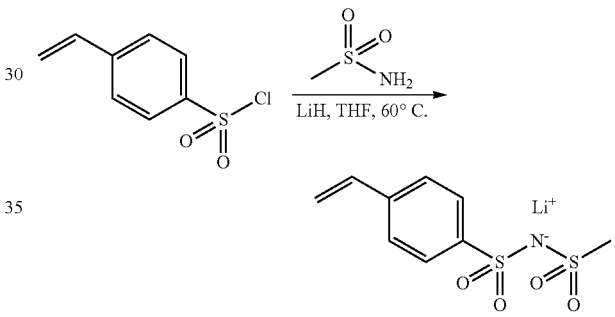

Before the synthesis, methane sulfonamide was dried in a vacuum oven overnight at 30° C. To a solution of the dried methane sulfonamide (0.100 mol, 1 moleq) and 4OH-TEMPO (30 mg, 500 ppm) in THF (100 mL) was added LiH (0.300 mol, 3 moleq) as a solid at once. The reaction mixture was stirred for 30 minutes at room temperature. Then, a solution of vinyl benzyl sulphonyl chloride (CI-SS) (0.100 mol, 1 moleq) in THF (50 mL) was added and the reaction mixture was heated to 60° C. (water bath temperature) for 16 h. The resulting solution was filtrated over celite and the resulting foam was dissolved in 500 mL ethyl acetate. Celite was added and the resulting slurry was stirred for 5 minutes. Then, the celite was filtered off and washed with 100 mL ethyl acetate. The solvent was then evaporated in vacuum and the resulting white foam was crushed with 500 mL diethyl ether overnight. The resultant product was collected by filtration and isolated as a white hygroscopic powder (yield was 80%, purity >94%).

The invention claimed is:
1. A composite membrane comprising:
   a) a first layer comprising a first porous support and a first ionic polymer present in the pores of the first porous support;
   b) a second layer comprising a second porous support and a second ionic polymer present in the pores of the second porous support;

c) a third layer comprising a third porous support, a third ionic polymer and a fourth ionic polymer, wherein the third ionic polymer is present in the pores of the third porous support;

wherein:
  (i) one of the first ionic polymer and the second ionic polymer is a cationic polymer and the other is an anionic polymer;
  (ii) the third layer c) is interposed between the first layer a) and the second layer b);
  (iii) the third ionic polymer comprises a network of pores and the fourth ionic polymer is present within the pores of the third ionic polymer; and
  (iv) one of the third ionic polymer and the fourth ionic polymer is a cationic polymer and the other is an anionic polymer.

2. The composite membrane according to claim 1 wherein third ionic polymer is obtainable by a process comprising phase-separation of the third ionic polymer from a composition used to prepare the third ionic polymer.

3. The composite membrane according to claim 2 wherein the phase-separation is polymerization induced phase separation.

4. The composite membrane according to claim 1 wherein the said network of pores comprises one or more further polymers.

5. The composite membrane according to claim 1 wherein the third ionic polymer has the same charge as the second ionic polymer.

6. The composite membrane according to claim 1 wherein the third and fourth ionic polymers are present in the third layer c) comprising a blend morphology of two continuous polymeric domains derived from the third and fourth ionic polymers respectively forming as a co-continuous network.

7. The composite membrane according to claim 1 wherein the first layer a), the second layer b) and the third layer c) each independently has an average thickness of between 10 µm and 200 µm.

8. The composite membrane according to claim 1 comprising a first interface between the first layer a) and the third layer c) and a second interface between the third layer c) and the second layer b) and both the first interface and the second interface are uninterrupted, without any gaps and/or spaces between the first layer a) and the third layer c) and without any gaps and/or spaces between the third layer c) and the second layer b).

9. The composite membrane according to claim 1 comprising a third interface between the third ionic polymer and the fourth ionic polymer which is uninterrupted, without any gaps and/or spaces between the third ionic polymer and the fourth ionic polymer.

10. The composite membrane according to claim 1 wherein the first ionic polymer is obtainable by a process comprising curing a first curable composition comprising:
  (a1) 0 to 60 wt % of a curable compound having one ethylenically unsaturated group and an ionic group;
  (b1) 1 to 88 wt % of a curable compound comprising at least two ethylenically unsaturated groups and optionally an ionic group;
  (c1) 0 to 10 wt % of radical initiator; and
  (d1) 0 to 55 wt % of solvent.

11. The composite membrane according to claim 1 wherein the second ionic polymer is obtainable by a process comprising curing a second curable composition comprising:
  (a2) 0 to 60 wt % of a curable compound having one ethylenically unsaturated group and an ionic group of charge opposite to the curable compound present in the first curable composition;
  (b2) 1 to 88 wt % of a curable compound comprising at least two ethylenically unsaturated groups and an ionic group;
  (c2) 0 to 10 wt % of radical initiator; and
  (d2) 0 to 55 wt % of solvent.

12. The composite membrane according to claim 1 wherein the third ionic polymer is obtainable by a process comprising curing a third curable composition comprising:
  (a3) 0 to 60 wt % of a curable compound having one ethylenically unsaturated group and an ionic group;
  (b3) 1 to 70 wt % of a curable compound comprising at least two ethylenically unsaturated groups and an ionic group;
  (c3) 0 to 10 wt % of radical initiator; and
  (d3) 20 to 98 wt % of solvent.

13. The composite membrane according to claim 1 wherein the fourth ionic polymer is obtainable by a process comprising curing a fourth curable composition comprising:
  (a4) 0 to 60 wt % of a curable compound having one ethylenically unsaturated group and an ionic group of charge opposite to the curable compound present in the third curable composition;
  (b4) 1 to 88 wt % of a curable compound comprising at least two ethylenically unsaturated groups and an ionic group;
  (c4) 0 to 10 wt % of radical initiator; and
  (d4) 0 to 55 wt % of solvent.

14. The composite membrane according to claim 1 which is a composite bipolar membrane.

15. The composite membrane according to claim 1 wherein the volume ratio of the third ionic polymer to the fourth ionic polymer is from 0.1 to 0.9.

16. A process for preparing a composite membrane comprising the following steps:
  I. providing a first porous support, a second porous support and a third porous support;
  II. providing a first curable composition comprising a curable ionic compound, a second curable composition comprising a curable ionic compound of charge opposite to the curable compound present in the first curable composition, a third curable composition comprising a curable ionic compound and a fourth curable composition comprising a curable ionic compound of charge opposite to the curable compound present in the third curable composition;
  III. impregnating the third porous support with the third curable composition;
  IV. curing the third curable composition present in the third porous support to form a base layer comprising the third porous support and the third, ionic polymer comprising a network of pores;
  V. impregnating the network of pores of the third ionic polymer with the fourth curable composition;
  VI. contacting the first curable composition with a first side of the base layer;
  VII. contacting the second curable composition with a second side of the base layer; and
  VIII. curing the first curable composition, the second curable composition and the fourth curable composition in any order or simultaneously thereby forming the first ionic polymer, the second ionic polymer and the fourth ionic polymer respectively;

wherein:
(a) when curing the first curable composition the first curable composition comprises the first porous support;
(b) when curing the second curable composition the second curable composition comprises the second porous support;
(c) one of the first curable composition and the second curable composition comprises a curable compound having an ethylenically unsaturated group and an anionic group and the other comprises a curable compound having an ethylenically unsaturated group and a cationic group; and
(d) one of the third curable composition and the fourth curable composition comprises a curable compound having an ethylenically unsaturated group and an anionic group and the other comprises a curable compound having an ethylenically unsaturated group and a cationic group.

17. The process according to claim 16 wherein the first curable composition comprises the first porous support when it is applied to the first side of base layer.

18. The process according to claim 16 wherein the first porous support is applied to the first curable composition after the first curable composition has been applied to the first side of the base layer.

19. The process according to claim 16 wherein the second curable composition comprises the second porous support when it is applied to the second side of the base layer.

20. The process according to claim 16 wherein the second porous support is applied to the second curable composition after the second curable composition has been applied to the second side of the base layer.

21. The process according to claim 16 wherein the first curable composition comprising the first porous support is cured before the second composition comprising the second porous support is cured.

22. The process according to claim 16 wherein the first curable composition comprising the first porous support and the second composition comprising the second porous support are cured simultaneously.

23. The process according to claim 16 wherein the first curable composition is identical to the fourth curable composition.

* * * * *